June 7, 1955    M. H. CROWELL    2,710,373
PROTECTIVE CIRCUIT FOR THREE-PHASE MOTORS
Filed Jan. 29, 1953

Marion H. Crowell
INVENTOR.

United States Patent Office 2,710,373
Patented June 7, 1955

2,710,373

PROTECTIVE CIRCUIT FOR THREE-PHASE MOTORS

Marion H. Crowell, Luling, Tex.

Application January 29, 1953, Serial No. 333,993

2 Claims. (Cl. 318—473)

This invention relates to a protective circuit for three-phase alternating current electrical motors and has particular application to very large industrial motors as are used in oil fields or other locations where the three-phase electrical power supply is subjected to acts of God or other casualties which will result in the elimination of one of the supply lines of the three-phase supply system thus providing to the motor a single-phase alternating current supply which would cause excessive overheating of the motor when run under load conditions.

The electrical motors to be protected by this invention are used for various purposes among which is included the use of such motors for pumping fluid from oil wells. If the motor were to stop running the suction would be lost resulting in the necessity of pumping large quantities of water until the head is regained. That being the case, it is undesirable to provide an automatic trip device which will automatically cut off power from a motor when the three-phase supply is interrupted and single-phase supply substituted therefor. However, while the three-phase motor can operate for a short period of time with single-phase supply and under light load conditions will not be adversely affected even for a longer period, the three-phase motor may excessively overheat when subjected to single-phase supply and a heavy load condition. That being the case, it is the primary object of this invention to provide a device for protecting the three-phase motor against damage due to operation with single-phase supply, the protector circuit permitting the motor to operate when not dangerously hot.

A further important object of the invention resides in the provision of a protective device for the three-phase motor that can be mounted on the motor in the exhaust air next to the windings of the motor in order to provide an extremely sensitive means for protecting the motor against damage due to excessive heat.

Still further objects of the invention reside in the provision of a protective circuit for three-phase alternating current motors that is constructed from a minimum number of parts so as to be extremely simple, capable of being installed on various types of existing motors, and which is relatively inexpensive to install.

These, together with the various ancillary objects and features of the invention which will become apparent as the following description proceeds, are attained by this protective circuit or safeguard, features of the invention being illustrated in the accompanying drawings, by way of examples only, wherein.

Figure 1:
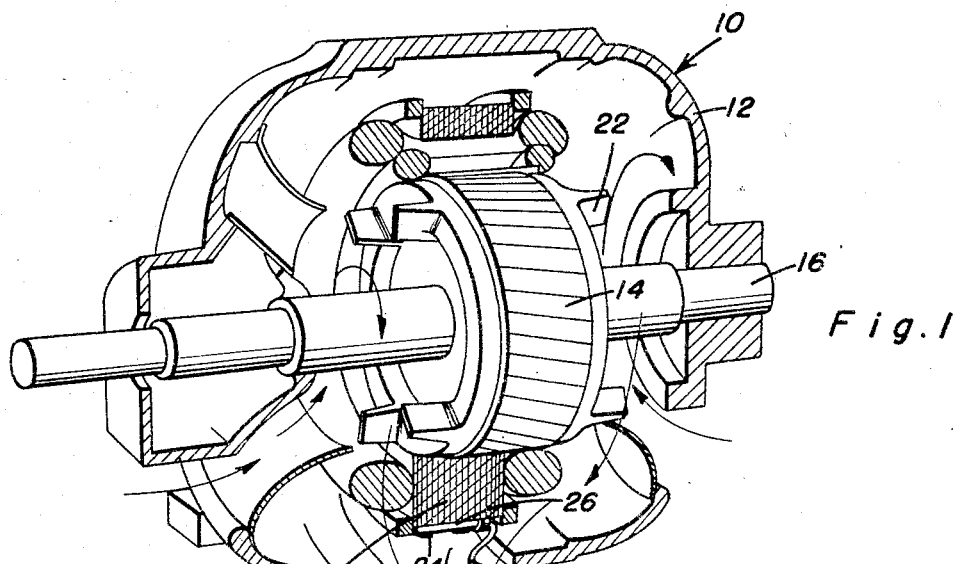
Figure 1 is a perspective view of an electrical motor on which the protective device is installed, with parts of the motor being broken away to show the elements of the invention in greatest detail.

With continuing reference to the accompanying drawings wherein like reference numerals designate similar parts throughout the various views, reference 10 generally designates a three-phase alternating current electrical motor having a casing 12, a rotor 14 mounted on a drive shaft 16 and a stator 18. The casing 12 is provided with ventilating apertures as at 20 through which cooling air may be exhausted, the cooling air being circulated by means of the fan blades 22 mounted on the rotor 14.

Figure 2:
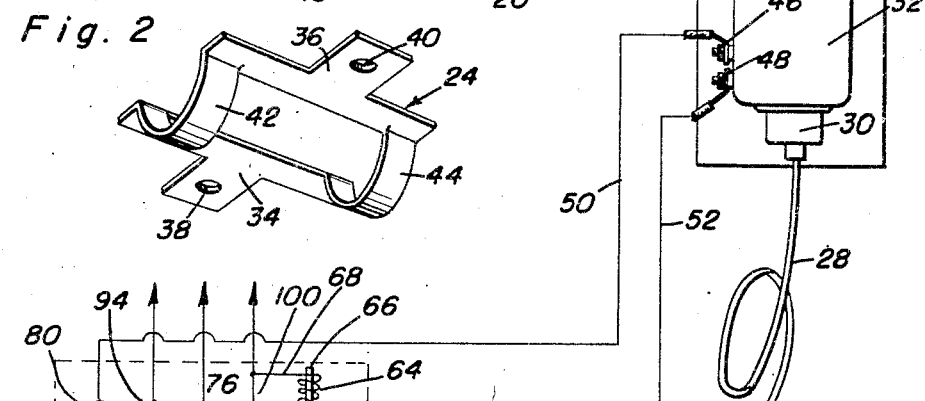
Figure 2 is a perspective view of the bracket used to support the temperature responsive element on the casing; and, Figure 3 is a wiring diagram of the protective circuit used.
Figure 3:
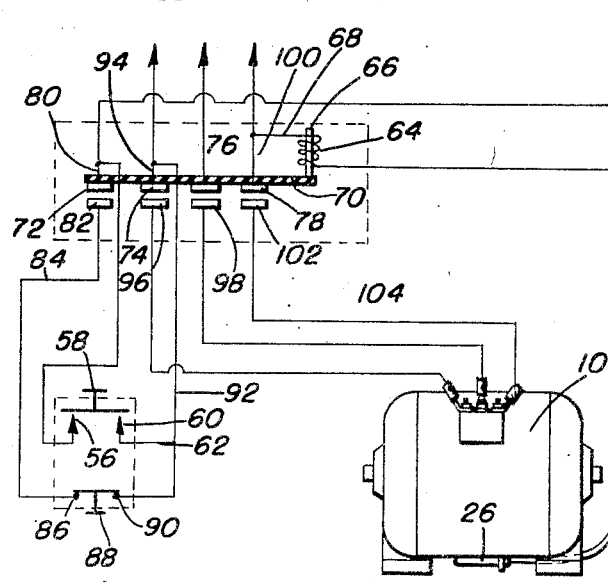

By means of a bracket 24 there is mounted on the motor 10 within the path of the exhaust gases circulating through aperture 20 an immersion type temperature responsive element 26 which may readily be of the capsule type connected by a hollow tube 28 to a bellows 30 of a thermally actuated switch 32, preferably of a mercury type. As is shown in Figure 2, the bracket 24 consists of a pair of T-shaped elements 34 and 36 having apertures 38 and 40 therethrough, through which may pass bolts or screws used in securing the T-shaped members 34 and 36 to the electric motor 10. The bracket may be readily installed on the stator 18, a point where the exhaust gases will be heated to their highest temperatures. The T-shaft members 34 and 36 are interconnected by arcuate straps 42 and 44 connected to the outermost ends of the cross arms of the T-shaped members 34 and 36. The straps 42 and 44 will securely hold the capsule 26 in place while permitting the exhaust airs to have ready access to the greatest proportion of the surface of the capsule 26.

The terminals 46 and 48 are connected by means of conductors 50 and 52 to one terminal 56 of a push-button stop switch 58, the other terminal 60 thereof being connected by means of a conductor 62 to line one of a three-phase alternating current power supply. The conductor 52 interconnects the coil 64 of a solenoid which actuates a core 66, the coil 64 being connected by conductor 68 to line two of the three-phase alternating current power supply. The core 66 is suitably attached to an insulative bar 70 on which there are mounted movable contacts 72, 74, 76 and 78. The contact 72 is connected in parallel with the conductor 50 by means of conductor 80 and is adapted to engage a fixed contact 82 connected by means of conductor 84 to one terminal 86 of a push-button stop switch 88 having its other contact 90 connected by means of conductor 92 to line one of the power supply. The contact 74 is connected by means of conductor 94 to line one of the power supply and is adapted to engage contact 96 which is connected to the motor 10. The contact 76 is connected to line three of the power supply and is adapted to engage contact 98 which is also connected to the motor 10. Contact 78 is connected by means of conductor 100 to line two of the power supply and is adapted to engage contact 102 connected by conductor 104 to the motor 10.

To start the motor 10 the push-button switch 58 will be depressed completing an operative electrical circuit through contact 56 and conductor 50 through the thermal switch 32 and conductor 52 to the coil 64 and line two of the power supply. Further, the contact 60 is connected to line one of the power supply placing a single-phase across the solenoid 64 which will close the movable and fixed contacts by actuating the insulative bar 70. Upon closing of the movable contacts with the fixed contacts three-phase alternating current will be supplied to the motor 10. If a casualty occurs, as for example lightning striking one of the transformers on one of the lines of the three-phase power supply single-phase power will be supplied to the motor 10. The motor 10 will continue operating until the exhaust gases are overheated to the extent that the temperature responsive element 26 will cause the switch 32 to break the circuit to the coil 64 thus opening the circuit between the movable contacts and the fixed contacts. Actuation of the push-button 88 will be effect break the circuit through the coil 64.

Since from the foregoing, the construction of this protective circuit for three-phase motors is readily apparent, further description is believed to be unnecessary.

However, since numerous modifications will readily occur to those skilled in the art after a consideration of the foregoing specification and accompanying drawings, it is not intended to limit the invention to the precise circuits and devices shown and described, but all suitable modifications and equivalents may be readily resorted to which fall within the scope of the appended claims.

What is claimed as new is as follows:

1. A protective device for three-phase alternating current motors comprising means supporting a temperature responsive element in the path of the exhaust gases of a motor, said temperature responsive element controlling the operation of a thermal switch, said switch controlling the operation of magnetic means for making and breaking an electrically operative circuit from a source of three-phase alternating current electrical power supply to said motor, and a control switch connected in series connection with said magnetic means and said thermal switch, said magnetic means including a movable insulative bar, a plurality of movable contacts carried by said bar, a plurality of fixed contacts, and a solenoid for moving said bar in selective response to said control switch and said thermal switch to control flow of current from said electrical power supply to said motor, said first recited means comprising a bracket including a pair of spaced T-shaped members, and arcuate bands interconnecting said T-shaped members embracing said temperature responsive element.

2. A protective circuit for three-phase alternating current motors comprising means securing an immersion type thermally responsive element to a motor to be protected in the path of the exhaust gases thereof, said means comprising a bracket including a pair of spaced T-shaped members, and arcuate bands interconnecting said T-shaped members embracing said temperature responsive element, a switch associated with said element remote from said element, a coil of a solenoid electrically connected to said switch and to a source of electrical power, a plurality of pairs of electrical contacts, each of said pairs of contacts including a movable contact and a fixed contact, said solenoid actuating said movable contact to selectively hold said movable contacts engaged and disengaged with said fixed contacts, said pairs of contacts selectively opening and closing an operative electrical circuit from a three-phase alternating current electrical power supply to said motor and from a control switch to said coil of said solenoid and source of power for exciting said coil.

References Cited in the file of this patent
UNITED STATES PATENTS

| | | |
|---|---|---|
| 2,189,996 | Riche | Feb. 13, 1940 |
| 2,261,632 | Rosing et al. | Nov. 4, 1941 |
| 2,471,840 | Seely | May 31, 1949 |
| 2,545,984 | Armstrong | Mar. 20, 1951 |